United States Patent
Wang et al.

(10) Patent No.: US 12,471,795 B2
(45) Date of Patent: Nov. 18, 2025

(54) INTEGRATED LASER DOPPLER BLOOD FLOW MEASUREMENT SYSTEM AND METHODS OF USE

(71) Applicant: Qatar Foundation for Education, Science and Community Development, Doha (QA)

(72) Inventors: Bo Wang, Doha (QA); Muhammad Asfandyar Awan, Doha (QA)

(73) Assignee: HAMAD BIN KHALIFA UNIVERSITY, Doha (QA)

(*) Notice: Subject to any disclaimer, the term of this patent is extended or adjusted under 35 U.S.C. 154(b) by 565 days.

(21) Appl. No.: 17/881,251

(22) Filed: Aug. 4, 2022

(65) Prior Publication Data

US 2024/0041341 A1    Feb. 8, 2024

(51) Int. Cl.
*A61B 5/026* (2006.01)
*A61B 5/00* (2006.01)

(52) U.S. Cl.
CPC .......... *A61B 5/0261* (2013.01); *A61B 5/6831* (2013.01); *A61B 5/6832* (2013.01); *A61B 5/7225* (2013.01); *A61B 2562/0233* (2013.01)

(58) Field of Classification Search
CPC ................................................... A61B 5/0261
See application file for complete search history.

(56) References Cited

U.S. PATENT DOCUMENTS

| | | | | |
|---|---|---|---|---|
| 4,109,647 A * | 8/1978 | Stern | ............... | G01P 3/36 356/28 |
| 4,154,529 A * | 5/1979 | Dyott | ............... | G01N 15/0205 356/28 |
| 4,166,695 A * | 9/1979 | Hill | ............... | A61B 5/0261 356/28 |
| 4,590,948 A * | 5/1986 | Nilsson | ............... | A61B 5/0261 600/479 |
| 4,596,254 A * | 6/1986 | Adrian | ............... | A61B 5/0261 356/28 |
| 5,588,437 A * | 12/1996 | Byrne | ............... | A61B 5/0261 600/479 |
| 5,778,878 A * | 7/1998 | Kellam | ............... | G01P 5/26 600/473 |
| 5,879,293 A * | 3/1999 | Hojaiban | ............... | G11C 7/1069 600/476 |
| 6,173,197 B1 * | 1/2001 | Boggett | ............... | A61B 5/0261 600/504 |
| 6,178,342 B1 * | 1/2001 | Borgos | ............... | A61B 5/022 600/473 |
| 6,259,936 B1 * | 7/2001 | Boggett | ............... | A61B 5/0261 600/475 |
| 6,701,171 B2 * | 3/2004 | Quistorff | ............... | A61B 5/0059 600/328 |
| 7,128,716 B2 * | 10/2006 | Higurashi | ............... | A61B 5/0261 385/12 |

(Continued)

OTHER PUBLICATIONS

Draijer, et al.; "Twente Optical Perfusion Camera: system overview and performance for video rate laser Doppler perfusion imaging"; Optical Society of America; 2009; (15 pages).

(Continued)

*Primary Examiner* — Colin T. Sakamoto
(74) *Attorney, Agent, or Firm* — K&L Gates LLP

(57) ABSTRACT

Provided are methods and devices for blood flow measurement.

17 Claims, 12 Drawing Sheets

Developed current measurement system: (a) the overall architecture including photocurrent to voltage and to frequency converters, (b) photo-diode and current buffer, (c) integrator-differentiator transimpedance amplifier, and (d) current to frequency converter.

(56) References Cited

U.S. PATENT DOCUMENTS

| | | | | |
|---|---|---|---|---|
| 7,130,672 | B2* | 10/2006 | Pewzner | A61B 5/14553 600/326 |
| 8,529,460 | B2* | 9/2013 | Kawano | A61B 5/0261 356/28.5 |
| 8,532,751 | B2* | 9/2013 | McKenna | A61B 5/0285 600/479 |
| 9,011,346 | B2* | 4/2015 | Wiard | A61B 5/02007 600/526 |
| 9,237,856 | B2* | 1/2016 | Tateishi | A61B 5/0261 |
| 9,241,637 | B2* | 1/2016 | Wiard | A61B 5/6829 |
| 9,833,151 | B2* | 12/2017 | Wiard | A61B 5/021 |
| 10,578,553 | B2* | 3/2020 | Sato | G01F 1/7086 |
| 11,160,473 | B2* | 11/2021 | Sakai | A61B 5/14551 |
| 11,486,892 | B2* | 11/2022 | Tateishi | G01F 1/661 |
| 11,529,078 | B2* | 12/2022 | Tateishi | A61B 5/0261 |
| 11,534,088 | B2* | 12/2022 | Otsuka | A61B 5/681 |
| 11,566,927 | B2* | 1/2023 | Tateishi | A61B 5/0285 |
| 11,666,237 | B2* | 6/2023 | Ito | G01F 1/663 600/504 |
| 11,771,335 | B2* | 10/2023 | Ito | A61B 5/7257 600/479 |
| 12,232,855 | B2* | 2/2025 | Wakita | A61B 5/0285 |
| 2001/0035503 | A1* | 11/2001 | Quistorff | A61B 5/0059 250/495.1 |
| 2002/0120203 | A1* | 8/2002 | Higurashi | G01F 1/661 600/479 |
| 2004/0054270 | A1* | 3/2004 | Pewzner | A61B 5/14546 600/341 |
| 2007/0179366 | A1* | 8/2007 | Pewzner | A61B 5/14546 600/310 |
| 2010/0016733 | A1* | 1/2010 | Smith | A61B 5/02416 600/483 |
| 2010/0056887 | A1* | 3/2010 | Kimura | A61B 5/14552 600/324 |
| 2010/0069727 | A1* | 3/2010 | Kawano | A61B 5/0261 356/450 |
| 2010/0081940 | A1* | 4/2010 | McKenna | A61B 5/02007 600/479 |
| 2010/0294917 | A1* | 11/2010 | Morgan | G01S 17/58 250/214 R |
| 2011/0087108 | A1* | 4/2011 | Onoe | A61B 5/0261 600/473 |
| 2013/0090564 | A1* | 4/2013 | Tateishi | A61B 5/0261 600/479 |
| 2013/0310700 | A1* | 11/2013 | Wiard | A61B 5/318 600/500 |
| 2015/0282718 | A1* | 10/2015 | Wiard | A61B 5/7264 600/483 |
| 2016/0095522 | A1* | 4/2016 | Wiard | A61B 5/0265 600/483 |
| 2018/0014731 | A1* | 1/2018 | Otsuka | A61B 5/6844 |
| 2018/0014735 | A1* | 1/2018 | Otsuka | A61B 5/02 |
| 2019/0059797 | A1* | 2/2019 | Otsuka | A61B 5/681 |
| 2019/0277875 | A1* | 9/2019 | Tateishi | G01F 1/72 |
| 2019/0290174 | A1* | 9/2019 | Sakai | A61B 5/7214 |
| 2019/0293557 | A1* | 9/2019 | Sato | A61B 5/0261 |
| 2020/0077934 | A1* | 3/2020 | Tateishi | G01F 1/663 |
| 2020/0205677 | A1* | 7/2020 | Ito | A61B 5/7257 |
| 2020/0284628 | A1* | 9/2020 | Tateishi | G01P 5/26 |
| 2021/0186345 | A1* | 6/2021 | Ito | A61B 5/7225 |
| 2022/0265157 | A1* | 8/2022 | Charthad | A61B 8/488 |
| 2023/0035537 | A1* | 2/2023 | Wakita | A61B 5/0261 |

OTHER PUBLICATIONS

Goldstein, et al.; "CMOS Low Current Measurement System for Biomedical Applications"; IEEE Transactions on Biomedical Circuits and Systems; vol. 6, No. 2; Apr. 2012; (9 pages).

Ferrari, et al.; "Transimpedance Amplifier for High Sensitivity Current Measurements on Nanodevices"; IEEE Journal of Solid-State Circuits; vol. 44, No. 5; May 2009; (4 pages).

Hsu, et al.; "A Hybrid Semi-Digital Transimpedance Amplifier With Noise Cancellation Technique for Nanopore- Based DNA Sequencing"; EEE Transactions on Biomedical Circuits and Systems; 2015; (10 pages).

* cited by examiner (a) Illustration of a wearable laser Doppler blood flow meter applied for peripheral arteries; (b) Doppler principle to estimate blood velocity; (c) light and tissues interaction with three wavelengths model and how different wavelengths penetrate the skin [18].

Developed current measurement system; (a) the overall architecture including photocurrent to voltage and to frequency converters, (b) photo-diode and current buffer, (c) integrator-differentiator transimpedance amplifier, and (d) current to frequency converter.

Timing diagram of the integrator and comparator outputs with bipolar input current from CCII buffer.

Photo-diode parasitic capacitance model and its influence on the integrator bandwidth: (a) without input current buffer, (b) with input current buffer.

Frequency response and transimpedance gain ($V_{out}/I_{in}$) of the integrator-differentiator based TIA.

Measurement results of differentiator output $V_{out}$ at input current $I_{in}$ = 80 nA.

Measured frequency output and non linearity of $f_{out}$ with respect to $I_{in}$.

Micro fluidic base measurement setup

Simulated blood using bio-mimetic micro spheres added saline water

Measurement results of micro-fluid (imitated blood), (a) pulse output at programmed flow rate of 0 mL/min (stationary), (b) Doppler shifted reset pulses at the programmed flow rate of 4.3 mL/min.

Measured output frequency versus Flow rate and the corresponding non-linearity.

Power consumption of the parts in PCB design.

INTEGRATED LASER DOPPLER BLOOD FLOW MEASUREMENT SYSTEM AND METHODS OF USE

TECHNICAL FIELD

This disclosure relates to wearable systems and methods for monitoring blood flow.

BACKGROUND

Smooth blood flow in the human body is vital to health as it supplies the essential oxygen and nutrients to other organs of the body. Any deficiency in the functioning of heart and/or blood vessels will appear as a varied blood flow speed.

Several health issues such as peripheral arterial disease (PAD), heart disease, body stiffness, numbness, and cerebrovascular disease may develop with the obstruction of blood flow. Specifically, PAD is a common blood circulatory problem in which narrowed arteries reduce blood flow to limbs. It may lead to pain and several other symptoms like foot wounds, eventually leading to foot or leg amputation in severe cases. Individuals with PAD have a much higher risk of heart attack or stroke. However, PAD sometimes has similar symptoms as other diseases which commonly occur around the same age; thus, it is essential to distinguish these underlying conditions for early and correct treatment. Such differentiation can be achieved by monitoring blood flow.

For example, Doppler ultrasound is a non-invasive and widely used method to estimate volumetric blood flow. However, it measures blood flow intermittently, resulting in errors caused by the angle of approach and operator variability. Anklebrachial pressure index (ABI) is also often used to assess blood flow for PAD diagnosis. However, some PAD patients with non-compressible lower extremity arteries may have falsely high ABIs, leading to wrong diagnosis and mistreatment. Magnetic resonance imaging has also been applied to measure blood flow, but it is quite complex and costly to perform.

Laser Doppler flowmeters (LDFs) use optical fibers as a spatial filter to conduct the laser light to skin tissues and pass the collected reflected signal to a photo detector to achieve a high signal-to-noise ratio. LDF requires optical lenses, filters, and fibers with an aligned focal axis of each component. Although the optical probe is small, the movement of the optical fiber still affects its measurement. Currently, it is possible to measure blood flow with a hot wire convective heating device, however, such device only measures the average instead of instantaneous blood flow.

Thus, several challenges are associated with these conventional blood flow measurement techniques. Further, current devices are typically only available in hospitals and used under the supervision of physicians and require other necessary facilities.

Therefore, improved systems and methods are of critical importance in this field.

SUMMARY

Disclosed embodiments comprise wearable systems for monitoring patient blood flow, and methods of use thereof.

BRIEF DESCRIPTION OF THE DRAWINGS

FIG. 2A shows the overall architecture including photocurrent to voltage and to frequency converters; FIG. 2B shows photo-diode and current buffer; FIG. 2C shows the integrator-differentiator transimpedance amplifier; and FIG. 2D shows the current to frequency converter.

FIG. 4A is without input current buffer; FIG. 4B with input current buffer.

FIG. 10A shows pulse output at programmed flow rate of 0 mL/min (stationary); FIG. 10B shows Doppler shifted reset pulses at the programmed flow rate of 4.3 m L/min.

DETAILED DESCRIPTION

Figure 1:
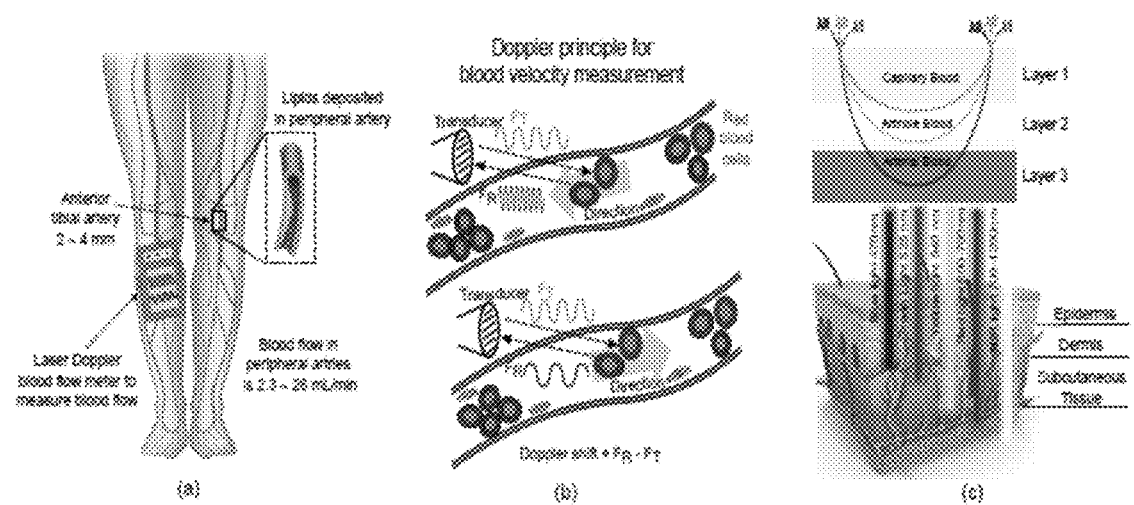
FIG. 1A is an illustration of a disclosed wearable laser Doppler blood flow meter applied for peripheral arteries.
FIG. 1B shows the Doppler principle to estimate blood velocity.
FIG. 1C shows light and tissue interaction with a three wavelengths model and how different wavelengths penetrate the skin.

Disclosed embodiments comprise systems and methods for measuring blood flow, for example continuously without requiring a physician or medical expert.

Definitions

"A" and "an" are used herein to refer to one or to more than one (i.e., to at least one) of the grammatical object of the article. By way of example, "an element" means one element or more than one element.

"Comprise," "comprising," "include," "including," "have," and "having" are used in the inclusive, open sense, meaning that additional elements may be included. The terms "such as", "e.g.", as used herein are non-limiting and are for illustrative purposes only. "Including" and "including but not limited to" are used interchangeably.

"In vitro" refers to an artificial environment and to processes or reactions that occur within an artificial environment. In vitro environments include, but are not limited to, test tubes and cell culture. The term "in vivo" refers to the natural environment (e.g., an animal or a cell) and to processes or reaction that occur within a natural environment.

"Or" as used herein should be understood to mean "and/or", unless the context clearly indicates otherwise.

"Patient," "subject," or "host" to be treated by the subject method can mean either a human or non-human animal, such as a mammal, a fish, a bird, a reptile, or an amphibian.

"Reducing", "suppressing" and "inhibiting" have their commonly understood meaning of lessening or decreasing.

"Treatment" or "treating" refers to any therapeutic intervention in a mammal, for example a human or animal such as a companion animal, including: (i) prevention, that is, causing the clinical symptoms not to develop, e.g., preventing infection or inflammation from occurring and/or developing to a harmful state; (ii) inhibition, that is, arresting the development of clinical symptoms, e.g., stopping an ongoing infection so that the infection is eliminated completely or to the degree that it is no longer harmful; and/or (iii) relief, that is, causing the regression of clinical symptoms, e.g., causing a relief of fever and/or inflammation caused by or associated with a microbial infection. Treatment can comprise multiple administrations of compositions disclosed herein.

"Wearable" means a device or system that can be reversibly attached to a body.

Blood Flow Measurement Systems

Disclosed embodiments comprise systems for collecting data, such as measuring blood flow. For example, disclosed embodiments can provide continuous measurement, or intermittent measurement.

In embodiments, disclosed systems comprise:
a. a laser diode;
b. a photodiode; and
c. an analog front-end (AFE);
d. on a 54 mm×64 mm three layers PCB board using discrete components.

In embodiments, the front end is designed with dual-design modes providing simultaneous current to voltage and frequency conversion and does not require an external clock source. In embodiments, the system provides a transimpedance gain of 151 dBΩ, whereas, with frequency conversion, we achieved a non-linearity of 0.048%, at the expense of 33 mA current drawn from a 3.2V supply. A comprehensive performance comparison with state-of-the-art current sensing front ends for biomedical applications is also provided.

Disclosed systems comprise wearable devices that can be reversibly attached to a patient's body. For example, in disclosed embodiments, the devices can be attached using adhesive, straps, elastic, and combinations thereof.

In embodiments, the processed data can be sent to a smart phone or computer via an installed Bluetooth module. The proposed system does not require optical filters or fibers; thus, dynamic artifacts are significantly reduced.

Disclosed embodiments do not require a physician or medical expert, thus providing accurate blood flow monitoring in the patient's home.

Methods of Use

In embodiments, the system can be placed on the body, for example close to the peripheral arteries and permit real-time blood flow monitoring for an extended period.

Subjects suitable for the disclosed methods and treatments can comprise, for example, mammals, such as humans or animals.

In embodiments, reads can be performed, for example, continuously, every 5 minutes, every 10 minutes, every 15 minutes, every 20 minutes, every 30 minutes, every 40 minutes, or the like.

Methods of Treatment

Disclosed embodiments comprise methods of treatment. For example, a patient can be diagnosed with PAD based on data collected from a disclosed wearable blood flow monitor. Following diagnosis, the patient can be treated with, for example, exercise, medication, or combinations thereof. For example, a PAD patient can be treated with aspiring or clopidogrel (Plavix).

Example 1

A miniaturized blood flowmeter using laser Doppler effect was developed for PAD disease application, as illustrated in FIG. 1A. Our proposed optical readout has a self-reset mechanism without requiring external clock. Hence, the system bandwidth is not limited by the speed of a master system clock. It should be noted that this work combines the current conveyor with both switched capacitor integrator and current to frequency converters for the first time. Another innovation of the readout is it uses only one integrator for both current-to-frequency and current-to-voltage conversion, which effectively reduces the device size and power consumption.

This device operates in voltage mode for small and fast current signals, starting from few tens of pA up to 80 nA in a bandwidth of 20 kHz. On the other hand it switches to the frequency mode for signals with larger magnitudes, i.e., for photo current up to 650 nA. Thus extending the dynamic range from tens of pA to 650 nA. Moreover, the designed readout achieves a non-linearity error of 0.05%, and a transimpedance gain of 151 dBΩ for signal from the photodiode. Our designed flow-meter does not require an optical lens, spatial filters, and optical fibers to transmit and receive optical signals, thereby reducing noise and dynamic artifacts in addition to significant power, area and, cost savings compared to existing LDFs.

Laser Doppler Blood Flow Meter Design Background

The Doppler effect offers a unique property to quantify the blood flow where the magnitude of the Doppler shift is proportional to the velocity of the blood cells in peripheral arteries. For a particle moving with velocity v, the well known Doppler effect leads to a frequency shift fshift between the incident light and the light scattered back by the moving particle. This frequency shift is proportional to the velocity v of the moving particle, the wavelength of the incident laser light λ, and the scattering angle θ, expressed as:

$$f_{shift} = \frac{v}{\lambda} \cdot \sin\theta. \tag{1}$$

where fshift is the frequency of Doppler-shifted reflected light that represents the change in the velocity v of the RBCs. Meanwhile, the negative or positive polarity of Doppler frequency shift indicates the direction of blood flow towards or away from the sensory system as shown in FIG. 1(b). Typically, the blood flow rate in arteries of diameter 800 µm to 1.8 mm ranges between 2.3~26 ml/min, The blood flow is a velocity-dependent parameter defined as:

$$Flow = \alpha \cdot \int_{\omega_1}^{\omega_2} \omega P(\omega) d\omega, \tag{2}$$

where $\{\omega i = 2\pi fi, i=1,2\}$, and the band of interest $f_1$, $f_2$ are typically designed to be 20 Hz and 20 kHz, respectively. (ω) is the power spectrum (in $A^2/Hz$) of the photo current. The term α (unit: $ml/min/A^2$) is a constant to correlate the sensed photo-current power to a velocity. Moreover, sensitivity of the PD and gain of the TIA is of paramount importance. The sensitivity of the PD needs to be >80%, whereas, for a minimal change in blood velocity, the corresponding change observed in photo current is in the range of tens of 100 pA.

As the blood flow velocity is altered by the lipid blockage in arteries, to measure tiny velocity variations (e.g., cm/sec), high transimpedance gain for the current signal in LDFs (>20 MΩ) is essential. As reported, green, blue, and yellow light can all reach the superficial capillary bed and the arterioles in the dermis, shown in FIG. 1(c). Whereas longer wavelengths such as red and infra-red can penetrate the skin and are able to reach the arteries between the dermis and subcutaneous tissue. During measurement, red light emitted from the laser LED with integrated reflector (LS-T67F) having a wavelength of 630 nm~645 nm shines over the anterior or posterior tibial artery in the legs through the skin. The light scattered by the RBCs and back-scattered light is collected on the PD The reflected light experiences a Doppler shift induced by the red blood cells moving within the peripheral arteries at a certain velocity. In contrast, the light frequency reflected by the dormant red blood cells (RBCs) and tissues stays the same. By collecting the reflected light signal with a photodiode (e.g., with a peak sensitivity of >80% for 550 nm~650 nm wavelength). The designed system converts the photocurrent to frequency and measures the average frequency in a small band. Thus, variations in blood flow can be acquired. Otherwise, on the other hand, there will be an exponential decay in the spectral domain as a result of the random velocities of the blood perfusion in the arteries that causes multiple scattering in the peripheral arteries.

Developed System and Circuit Design Considerations
System Description

Current measurement front-ends have been extensively described and analyzed in the literature. These circuits have limited dynamic range primarily because of circuit noise and supply voltage, limiting their minimum and maximum input currents. In addition, the digital output is often desirable for further signal processing in the digital domain, so the front-end should be able to function as an analog-to-digital converter simultaneously, and a low-noise signal amplifier. It is desirable to design and optimize a front-end that achieves high linearity while reducing power consumption, especially for high dynamic range bio-sensing applications. Recently, system architectures based on a light to frequency or amplification, filtering, and digitization of the PD current in a single stage, obviating the need for Transimpedance amplifiers.

Figure 2:
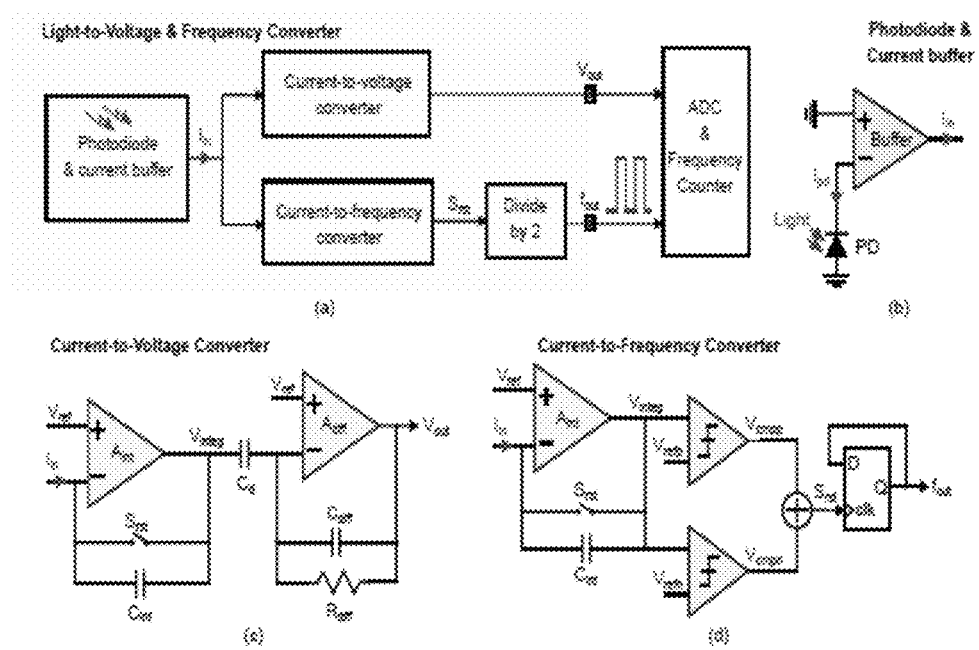
FIG. 2 shows a disclosed current measurement system.

The developed current measurement analog front-end (AFE) for LDF is shown in FIG. 2A. It consists of a photo-diode, an input current buffer [FIG. 2B], a current-to-voltage [FIG. 2C], a current-to-frequency converter [FIG. 2D], and a modulo two counter. This AFE is designed to provide both voltage and frequency output Vout and fout. Specifically, the voltage mode operation is preferred when the input current signal is smaller in magnitude and exhibits higher bandwidth. On the other hand, the frequency mode performs better with large input currents from the photo-diode. Therefore, This AFE can switch between the frequency and voltage modes of operation to maximize the measurable current range. By using a current buffer at the input as shown in FIG. 2B, the large parasitic capacitance of the photo-diode does not directly load the integrator input [$A_{int}$ in FIGS. 2C and 2D, which would otherwise restrict its attainable gain-bandwidth product, and increase the system output noise and non-linearity. As in FIG. 2D, the proposed selfresetting current-to-frequency conversion topology does not require an external reset or clock signal. Thus the bandwidth of the system is not limited by the predefined sampling clock.

Circuit Operation

Figure 3:
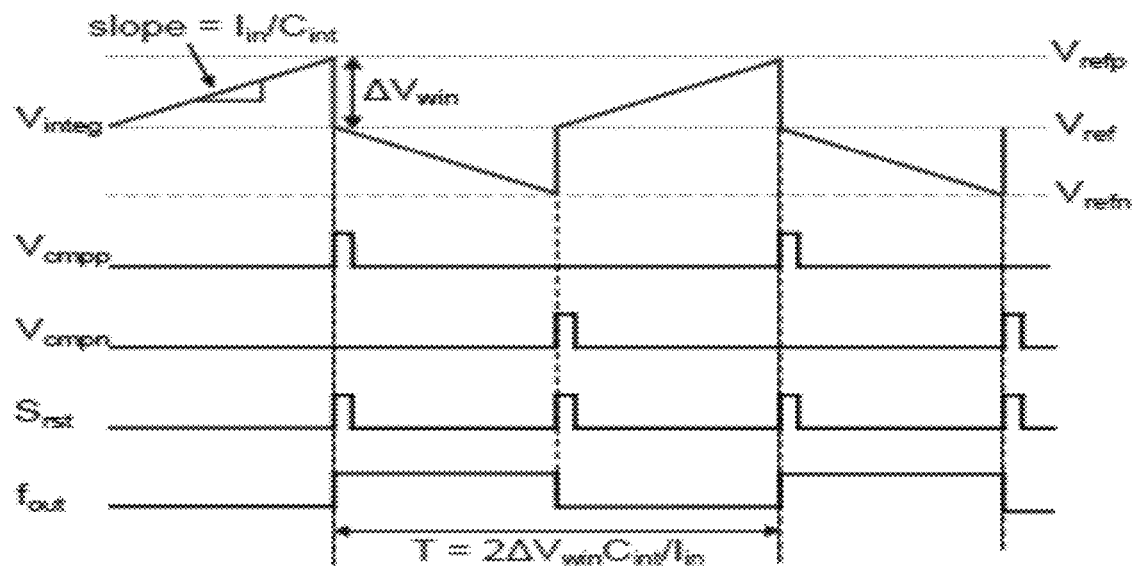
FIG. 3 shows a timing diagram of the integrator and comparator outputs with bipolar input current from CCII buffer.

The current-to-voltage converter shown in FIG. 2C employs an integrator-differentiator topology. Its voltage output is $$V_{out} = V_{ref} + (R_{diff} \cdot I_{in}) \cdot \frac{C_d}{C_{int}} \quad (3)$$

where $V_{ref}$ a reference voltage designed to be $V_{DD}/2$, $C_{int}$=2 pF is the integrator capacitor, $R_{diff}$=4 MΩ and $C_d$=20 pF are the feedback resistance and capacitance of the differentiator, respectively. $S_{rst}$ is an asynchronous self-reset switch to prevent the integrator from saturation by limiting the output of the integrator within a predefined voltage window, $V_{refP}$ and $V_{refN}$. As shown in FIG. 2D, when the integrator output $V_{integ}$ crosses predefined threshold voltages, the corresponding comparator is triggered and $V_{integ}$ is compared with $V_{refP}$ and $V_{refN}$ to produce $S_{rst}$. $V_{refP}$ and $V_{refN}$ are chosen as, $V_{refP}$–Vref=$V_{ref}$–$V_{refN}$=$\Delta V_{win}$. The output of the integrator is bounded by $\Delta V_{win}$ to prevent it from saturation. The selection of $\Delta V_{win}$ also affects the SNR of the frequency output as elaborated. This self-control scheme also generates a frequency output fout almost for free (with only one extra D flip-flop). To derive the relationship between $f_{out}$ and $I_{in}$, FIG. 3 shows the timing diagram of the integrator output Vinteg, the comparator output $V_{cmpp}$ and $f_{out}$ for the positive input current. As $V_{integ}$ exceeds $V_{refp}$, $V_{cmpp}$ triggers, thus resetting the integrator output to $V_{ref}$ which again resets $V_{cmpp}$ (the pulse width shown in FIG. 3 is exaggerated for illustration purpose). Therefore, the output frequency $f_{out}$ can be expressed as:

$$f_{out} = \frac{I_{in}}{2 \cdot \Delta V_{win} \cdot C_{int}}. \quad (4)$$

where, $I_{in}$ can be represented as:

$$I_{in}=A \cdot \sin(2\pi f_{pd} t) \quad (5)$$

$f_{pd}$ is the frequency of the incoming Doppler shifted light and t represents the time instant or interval at which the input current signal is sampled. The final output frequency $f_{out}$ is directly proportional to the buffered frequency modulated photo-current, $$f_{out} = \frac{A \cdot \sin(2\pi f_{pd})}{2 \cdot \Delta V_{win} \cdot C_{int}}, \quad (6)$$

The C-F converter will sense and convert the frequency modulated current from photodiode, while keeping the amplitude A of the input current constant.

Circuit Design Considerations

1) Input Current Buffer

Figure 4:
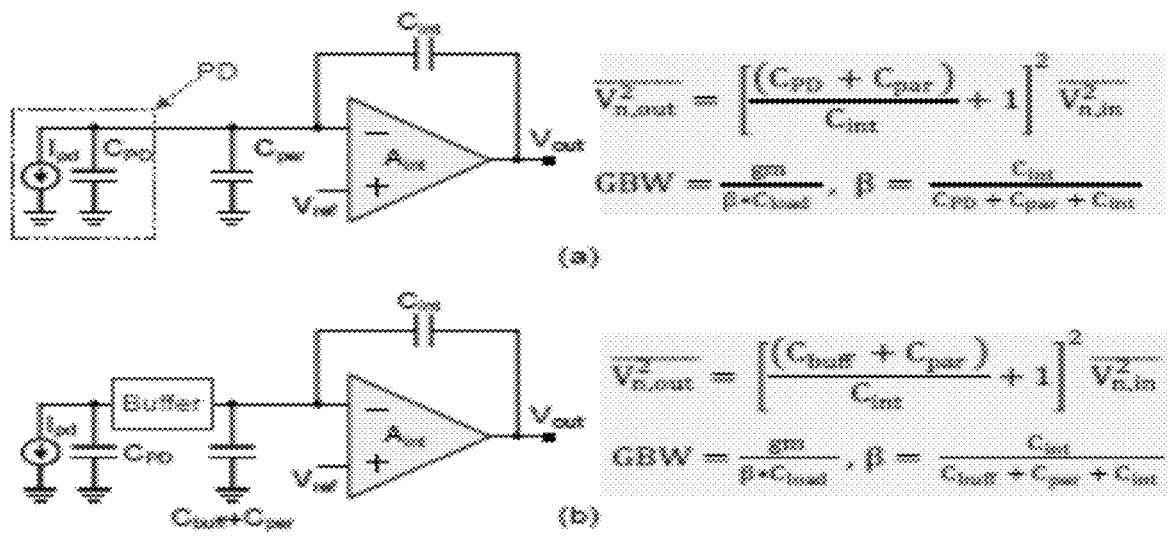
FIG. 4 shows a photo-diode parasitic capacitance model and its influence on the integrator bandwidth.

The first stage of the AFE is a current buffer following the photo-diode. This design employs a current conveyor-based current buffer (AD844JRZ). It performs the decoupling and linear operations in current mode the same way as voltage buffer performs in voltage mode. We choose current conveyor CC-II architecture with a low input impedance common-base input stage, thus arranged as a current buffer. The selected conveyor architecture has a differential structure with bi-directional output, thus offering an inherent property of dark current or DC rejection from the photo-diode. More importantly, the intrinsic properties of CCII buffer make it a promising front end choice in sensing applications, which includes but not limited to, low input impedance for a minimal signal attenuation, and insensitive to the stray capacitance at sensor interface, as in our design. The input current buffer prevents the photo-diode parasitic capacitor (40 pF to 135 pF) from loading the succeeding stage of the AFE by limiting the minimum detectable current. The output noise of the chosen current buffer is 10 pA. FIG. 4 details the functionality and contribution of the current buffer. The design parameters listed in the figure are the transconductance $g_m$ of A, the feedback factor $\beta$ of the integrator, the input parasitic capacitance $C_{par}$ of $A_v$, the photo-diode parasitic capacitance CPD, and the current buffer output capacitance $C_{buf}$. As in FIG. 4A, if not isolated, $C_{PD}$ would greatly increase (a few 10×) the integrator output noise $V^2_{n,out}$. $C_{PD}$ also reduces the feedback factor $\beta$ of the integrator, which results in integrator bandwidth degradation and higher non-linearity. With an input current buffer, the junction capacitance from the photo-diode can be isolated to avoid the detrimental capacitive divider effect.

2) Current-to-Voltage Converter

The C-V converter in our design employs a continuous-time integrator-differentiator architecture, which is known for small current measurements as shown in FIG. 2C. The high gain of the integrator stage ensures low noise density, whereas the differentiator stage yields a flat frequency response. It is usually designed with $C_d/C_{int} \gg 1$ and large differentiator resistor $R_{diff}$ to make the thermal noise of the $R_{diff}$ negligible to minimize the equivalent input noise. However, different from conventional designs, our design is limited by the bandwidth requirements i.e., 20 kHz, therefore, $R_{diff}$ will be chosen such that it fulfills the bandwidth requirement. The equivalent input referred current noise density of this converter is:

$$\overline{I^2_{n,in}} = \overline{V^2_{n,Aint}} \cdot [(2\pi f)^2 (C_{int} + C_{par})^2] + \frac{4kT}{R_{diff}} \cdot \left(\frac{C_{int}}{C_d}\right)^2 \quad (7)$$

where k is the Boltzmann constant, T is the absolute temperature, and $\overline{V^2}_{n,Aint} \sim 8$ nV/√Hz is the input noise density of the adopted amplifier $A_{int}$ LTC6244. As expressed, input referred current noise reduces due to the thermal noise of $R_{diff}$ by the factor of $(C_d/C_{int})$ As $R_{diff}$=4 MΩ is not very large, it will be the dominant noise source in integrator-differentiator TIA design.

Besides noise and dynamic range considerations, the frequency response of the converter should also be analyzed. In FIG. 2C, the cutoff frequency $f_H$ of the converter is achieved by canceling a DC pole of the integrator $A_{int}$ with a DC zero provided by the differentiator $A_{diff}$. We assume $A_{diff}$ has a dominant pole $f_0$ and a DC gain of $A_d$. The −3 dB frequency and the damping factor ξ of the system [FIG. 2C] is given by:

$$f_H = \frac{1}{2\pi \cdot R_{diff} \cdot C_{diff}} \quad (8)$$

$$\xi = \sqrt{\frac{R_{diff} C^2_{diff} \cdot A_d f_0}{4(C_{diff} + C_d)}} \quad (9)$$

To minimize the overshoot and ringing in the signal mid-band, (10) should hold:

$$GBW = A_d f_0 \geq \frac{(C_{diff} + C_d)}{C_{diff}} \cdot \frac{4\xi^2}{2\pi \cdot R_{diff} \cdot C_{diff}} \quad (10)$$

where $\xi \geq 1/\sqrt{2}$ is often required. With $C_{diff}$=2 pF, $C_d$=20 pF and $R_{diff}$=4 MΩ, a transimpedance gain of 40 MΩ and a −3 dB bandwidth of 20 kHz can be achieved to meet our target application requirements.

3) Current-to-Frequency Conversion

For C-F conversion, outputs from the comparators are firstly XOR-ed, followed by a D-Flip flop in its modulo-2 configuration to produce $f_{out}$. This asynchronously generated frequency output does not contain quantization noise. Despite that, several other factors can still contribute noise and non-linearities. The voltage noise of the comparator is one of the critical factors, as it introduces clock jitter. Once $V_{integ}$ crosses one of the reference voltages $V_{refP}$ or $V_{refN}$, the input-referred voltage noise of the comparators will introduce a stochastic delay to the rising and falling edge of the frequency output. Referring to datasheets of the adopted devices, the calculated voltage noise at the input of the comparator $V^2_n$=107.74 fV²/Hz, which is composed of the output referred noise of the integrator $V^2_{integ,n}$ and the input-referred noise of the comparator (LTC1441) $V^2_{n,cmp}$. After the comparator operation, the clock jitter at the output of the comparator can be quantified as:

$$\delta_{jitter-readout} = \overline{V_n} \cdot \frac{C_{int}}{I_{in}} \quad (11)$$

The clock jitter limits the minimum detectable change in $f_{out}$, which in turn limits the minimum detectable input current change from the photo-diode. Note that the frequency output period is $T_{out}=2\Delta V_{win} \cdot C_{int}/I_{in}$, as derived from (4). So the signal-to-noise ratio of the frequency readout SNR$_{fout}$~Tout/$\sigma_{jitter-readout}$~$\Delta V_{win}/V_n$. A larger $\Delta V_{win}$ or by reducing the total voltage noise referred to the comparator input node can improve the SNR of frequency output. Thus, with $V_n$=47 µVrms in 20 kHz bandwidth, and $\Delta V_{win}$=800 mV, the expected frequency readout SNR is approximately 80 dB.

The non-linearity in fout is primarily caused by the charge injection from the reset switches in the integrator feedback path and the propagation delay from the components in digital logic path. Whenever $S_{rst}$ toggles, it introduces an error voltage at the start of the next conversion cycle. This error is generated as a result of switch injection. Also, the delay in the reset operation is due to the propagation delay of the XOR gate, DFF, and comparators, which can be addressed by using high-speed components. This propagation delay affects the frequency output and results in slower fout. Experimental results show that for large input currents, the corresponding non-linearity increases.

IV. Device Implementation and Measurement

A. Implementation

Figure 5:
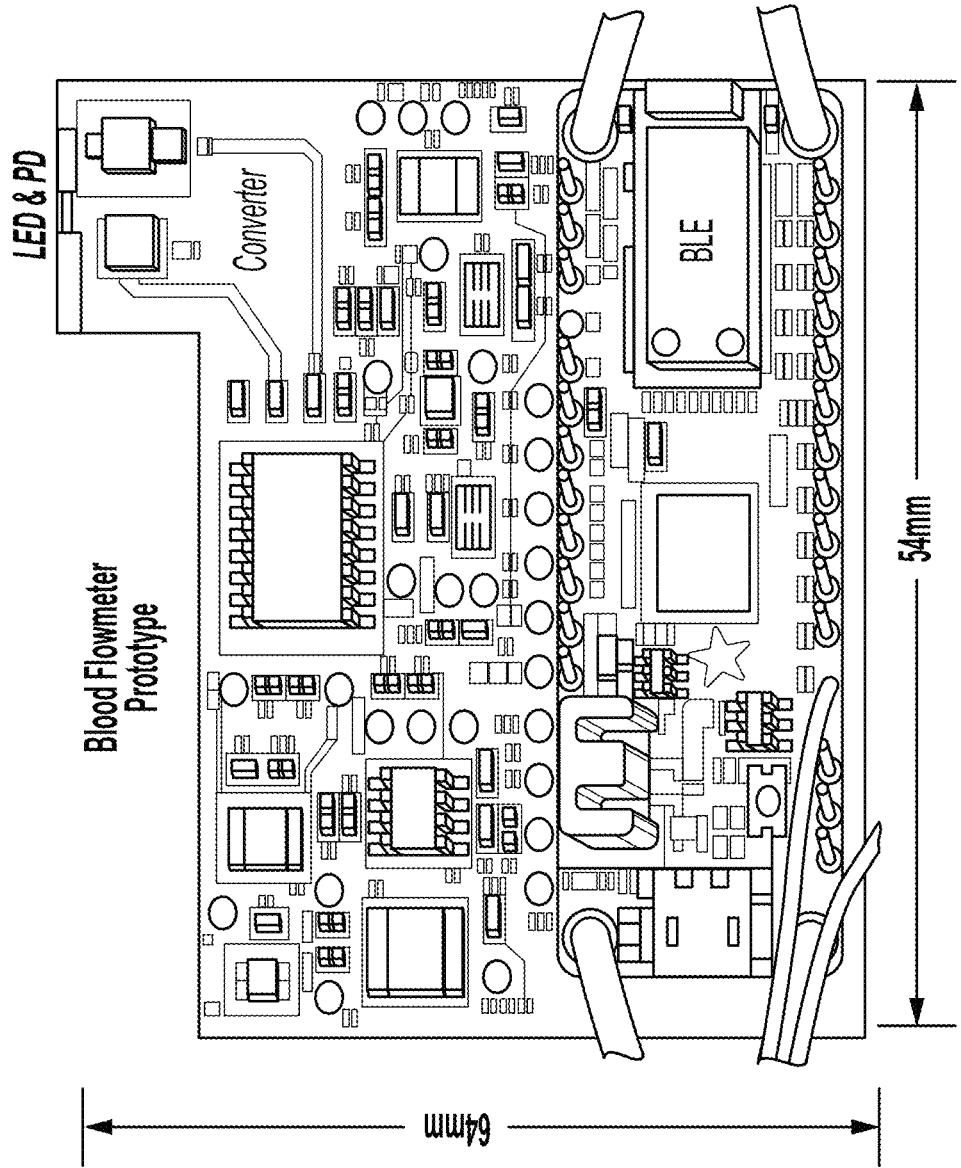
FIG. 5 shows a designed proof-of-concept board of a disclosed blood flowmetry system.

In this study, discrete components are used to build the proof-of-concept prototype as shown in FIG. 5A. The implemented board is divided into three major parts. A transmitter comprising a constant current linear LED driver (AL5809), and the LED itself. The LED has a peak wavelength sensitivity at 630 nm. The receiver part embodies a photodiode, which is sensitive to the wavelength range of 627 nm~645 nm emitted by the transmitter LED, followed by the AFE comprising both the current to voltage and frequency converters. A 3.3 V LDO provides a stable power supply voltage for all the components. A reference voltage generator is also implemented to provide the required bias voltage for the integrator, differentiator, and comparators. The differentiator is implemented as a band-pass filter, and it sets the high cut-off frequency $f_H$. Note that $f_H$ can be handily adjusted for different types of applications and patients based on their age and medical history (e.g., patients suffering with heart disease or taking certain medicines) by simply tuning Cdiff without compromising the in-band gain or noise performance of the AFE. The op-amp chosen for the integrator requires a current noise less than fA/Hz and an input capacitance of only a few pF. Therefore a MOS-input base op-amp with low input bias current of 1 pA is employed.

B. Measurement

The fabricated system is characterized by two individual set-ups. First, in electrical testing, the input current is varied to measure the corresponding output frequency and voltage outputs. The second experiment involved a demo biological set-up, comprising fluid with silicon micro-spheres representing RBCs in the blood pumped to maintain a particular flow rate and record the corresponding output frequency.

1) Electrical Measurement

Figure 6:
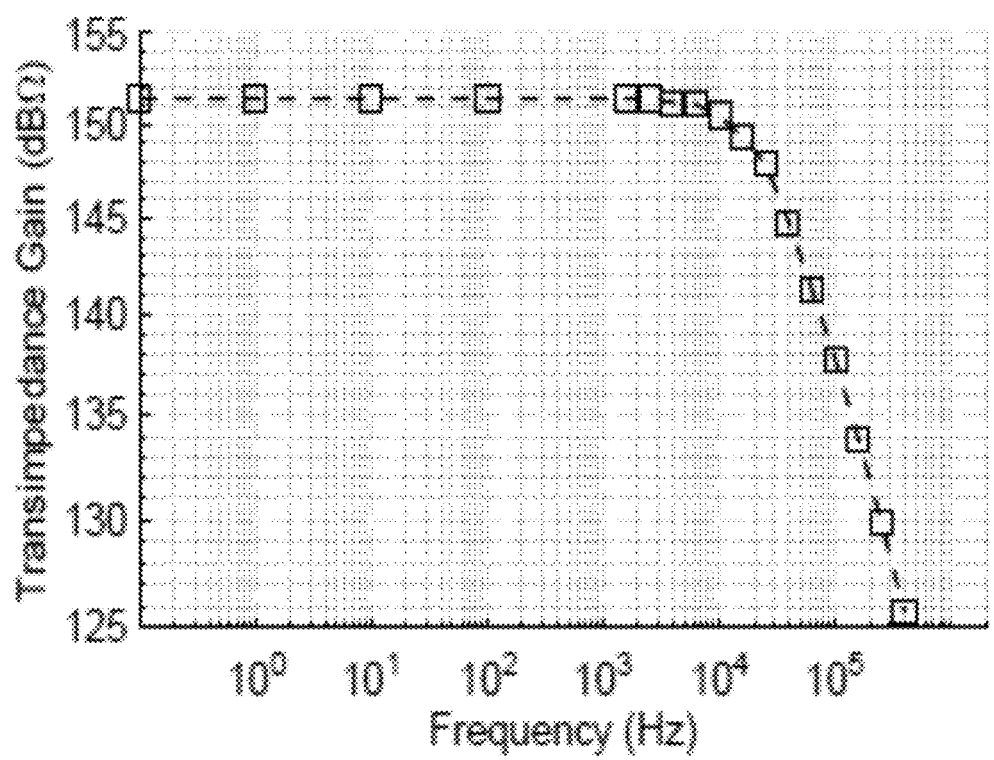
FIG. 6 shows frequency response and transimpedance gain ($V_{out}/I_{in}$) of the integrator-differentiator based TIA.
Figure 7:
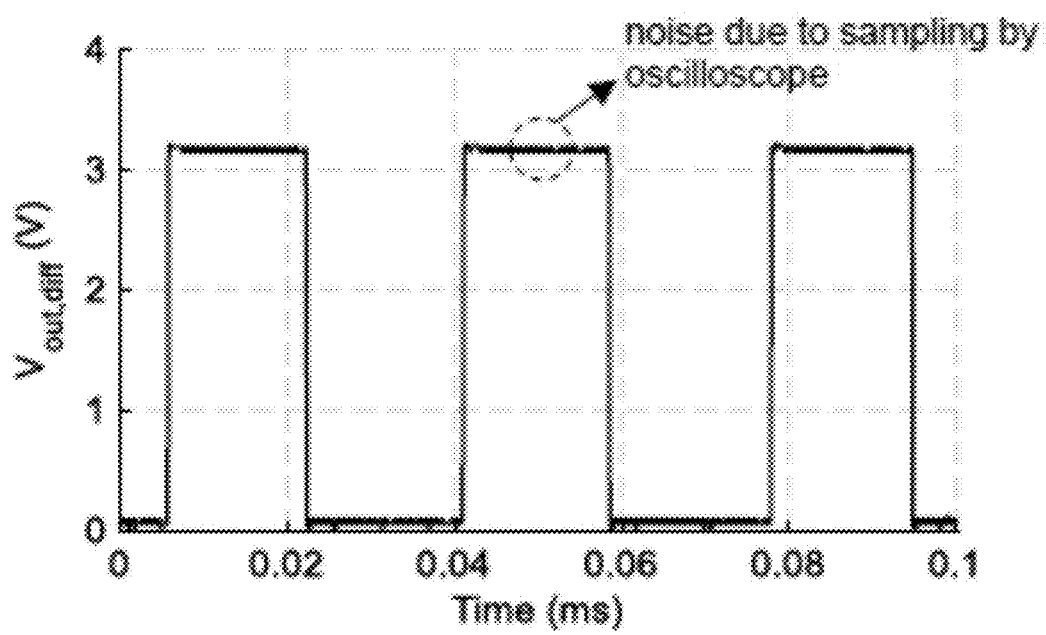
FIG. 7 shows measurement results of differentiator output $V_{out}$ at input current $I_{in}$=80 nA.
Figure 8:
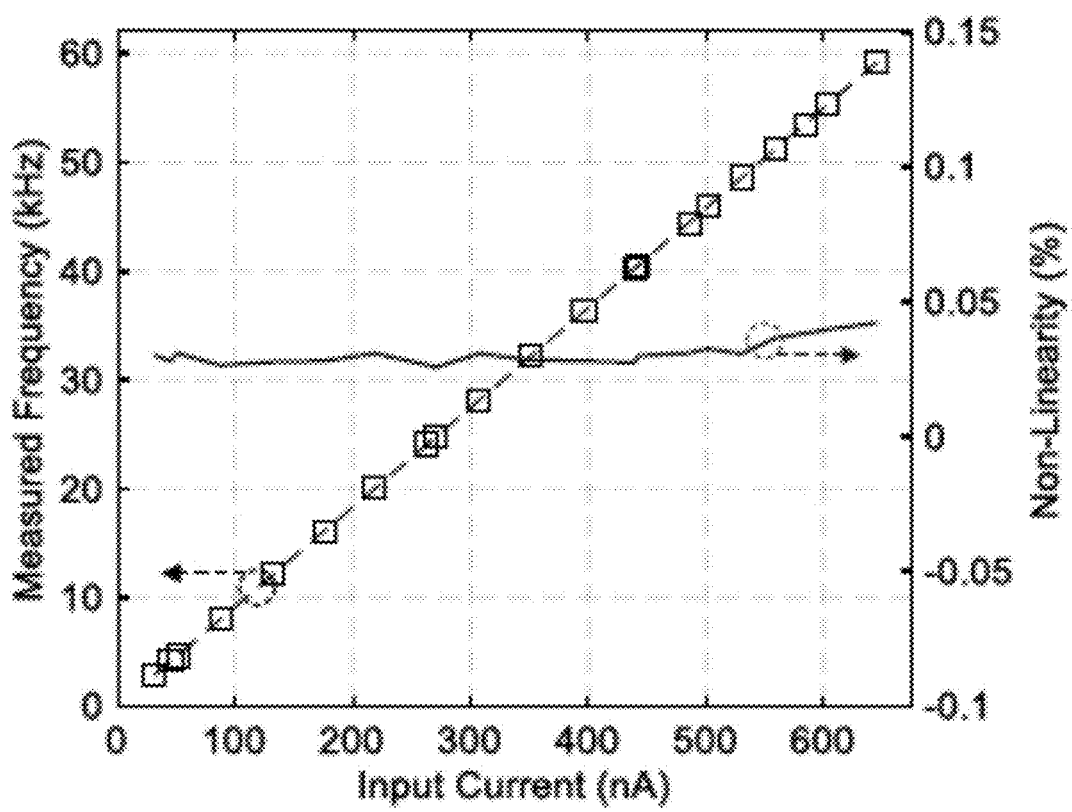
FIG. 8 shows the measured frequency output and non linearity of $f_{out}$ with respect to $I_{in}$.

A comparison of the measured and simulated frequency responses for the integrator differentiator TIA is shown in FIG. 6. The measured transimpedance gain is 151 dBΩ (40 MΩ) with a −3 dB bandwidth of approximately 20 kHz. FIG. 7 presents the differentiator output Vout for a square wave input current of 80 nA. Since the input current signal is small enough, the integrator output voltage remains below the threshold window, which cannot trigger the frequency output $f_{out}$. In addition, variable input current $I_{in}$ up to 700 nA was supplied, with the corresponding frequency output $f_{out}$ and its non-linearity shown in FIG. 8. The maximum recorded frequency output is for the input current of 650 nA, limited by the combined effect of the propagation delay of the XOR gate, DFF, and comparators that cause a delay in reset operation, which in turn saturates the integrator output. The signal current ranges between tens of pA ~80 nA and bandwidth ≤20 kHz can be perceived on both the voltage and frequency outputs. Still, the integrator-differentiator output offers better fidelity and wide bandwidth for lower amplitude signals.

Figure 9A:
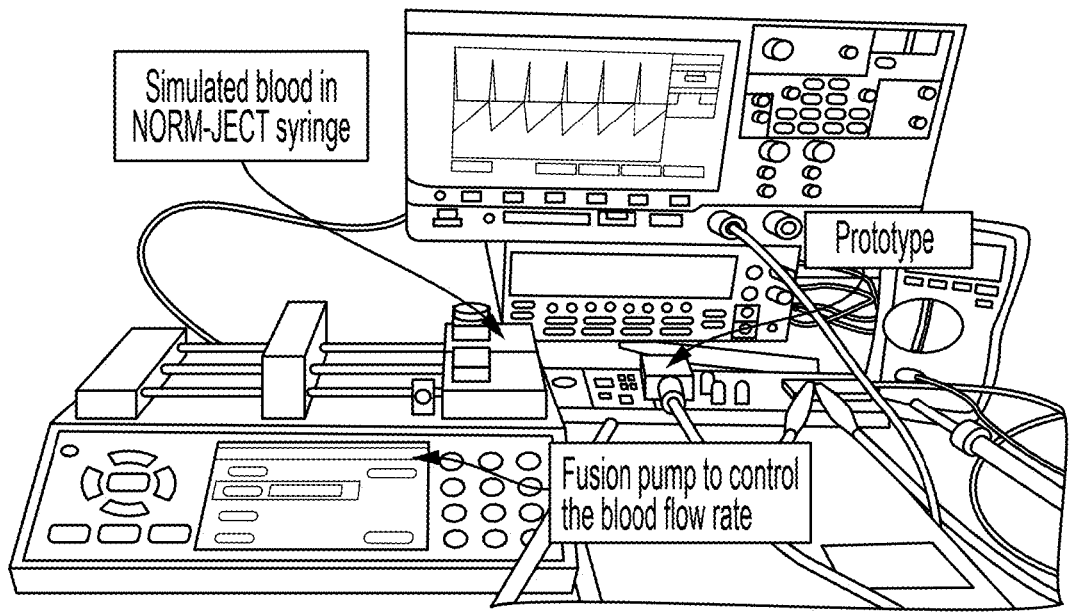
FIG. 9A shows micro fluidic base measurement setup.
Figure 9B:
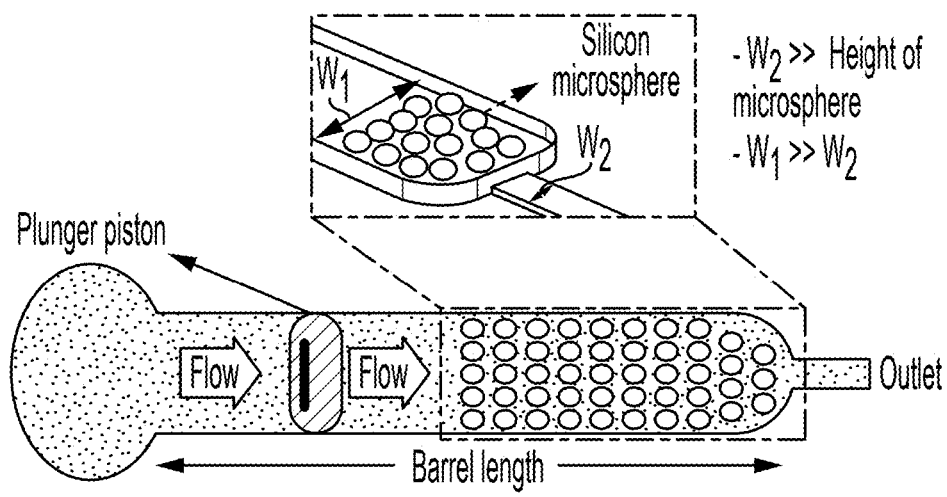
FIG. 9B shows simulated blood using bio-mimetic micro spheres added saline water.
Figure 10:
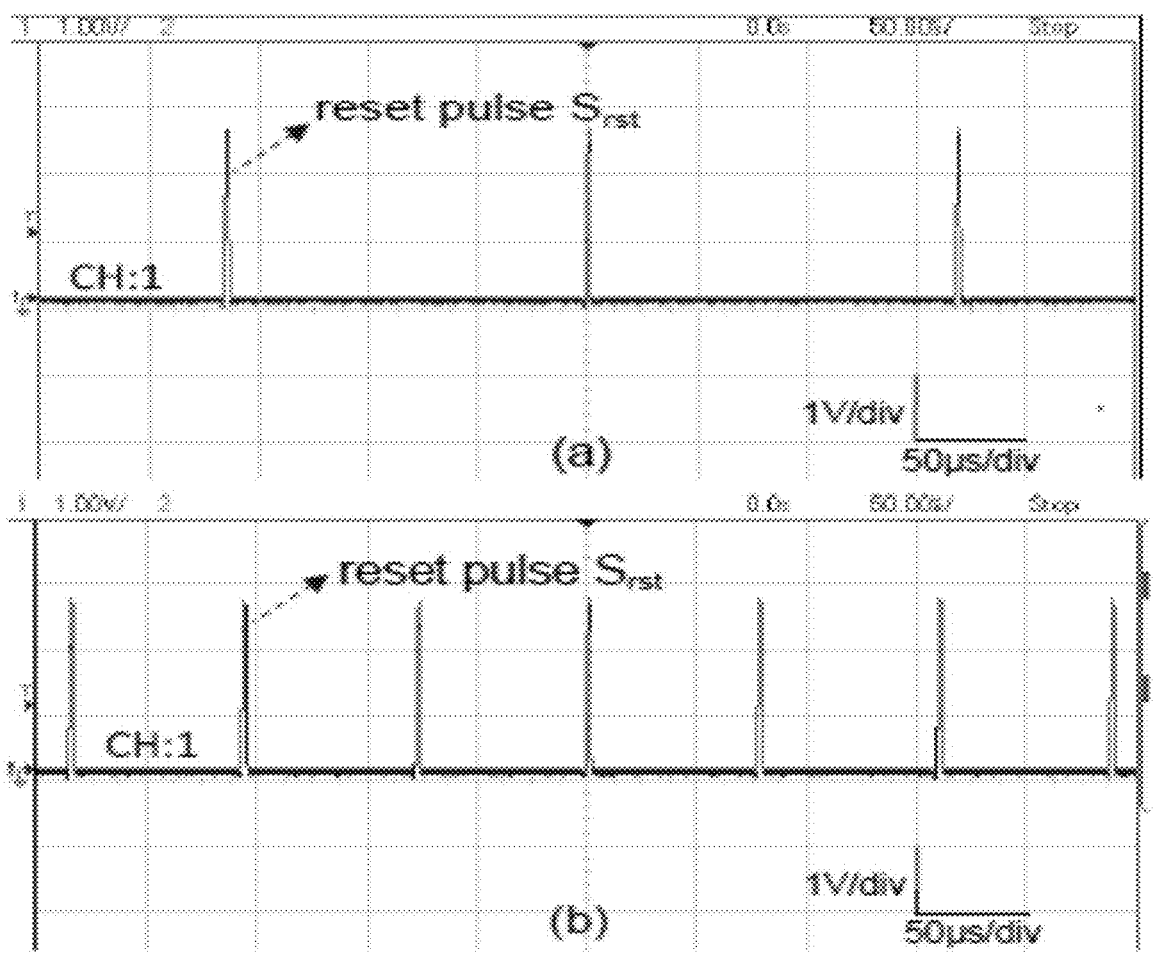
FIG. 10 shows measurement results of micro-fluid (imitated blood)

2) Biomemitic Microfluid Measurement:

To demonstrate the blood flow measurement using our system, we recorded the output frequency by changing the blood flow through a syringe pump. The overall blood flow measurement setup is show in FIG. 9A. We used a syringe pump in conjunction with syringes and tubing that could hold volumes between 1 mL and 5 mL to control the fluid flow. The flow and circulation were arranged to avoid air bubbles. Moreover, to minimize turbulent or unsteady flow, the tubing and syringe were kept straight at a distance of at least five times the diameter of the tube. Bio-mimetic silica microspheres are commonly used for biological measurement, as they exhibit uniform ordering and pore sizing, while providing a high surface area to volume ratio. In this experiment, silicon micro spheres are mixed with saline water to mimic the RBCs. Their pore properties offer an excellent way to deliver and store inter cellular materials, exhibiting RBC-like environment. Considering the high binding capability of microbeads, we diluted 2 mg (absolute number 0.70~1.50×10$^8$) of silica microbeads in 1 mL of saline water, which is similar to the amount of RBCs in human blood. The fusion pump was calibrated and programmed between 0 and 4.3 mL/min. The input and output frequencies were recorded at 0 mL/min when the fluid was stationary to develop the baseline measurement shown in FIG. 10. Afterwards, the flow rate was varied step-wise from 0.1 mL/min to 4.3 mL/min, with multiple data points (10 seconds of measurement) recorded.

Figure 11:
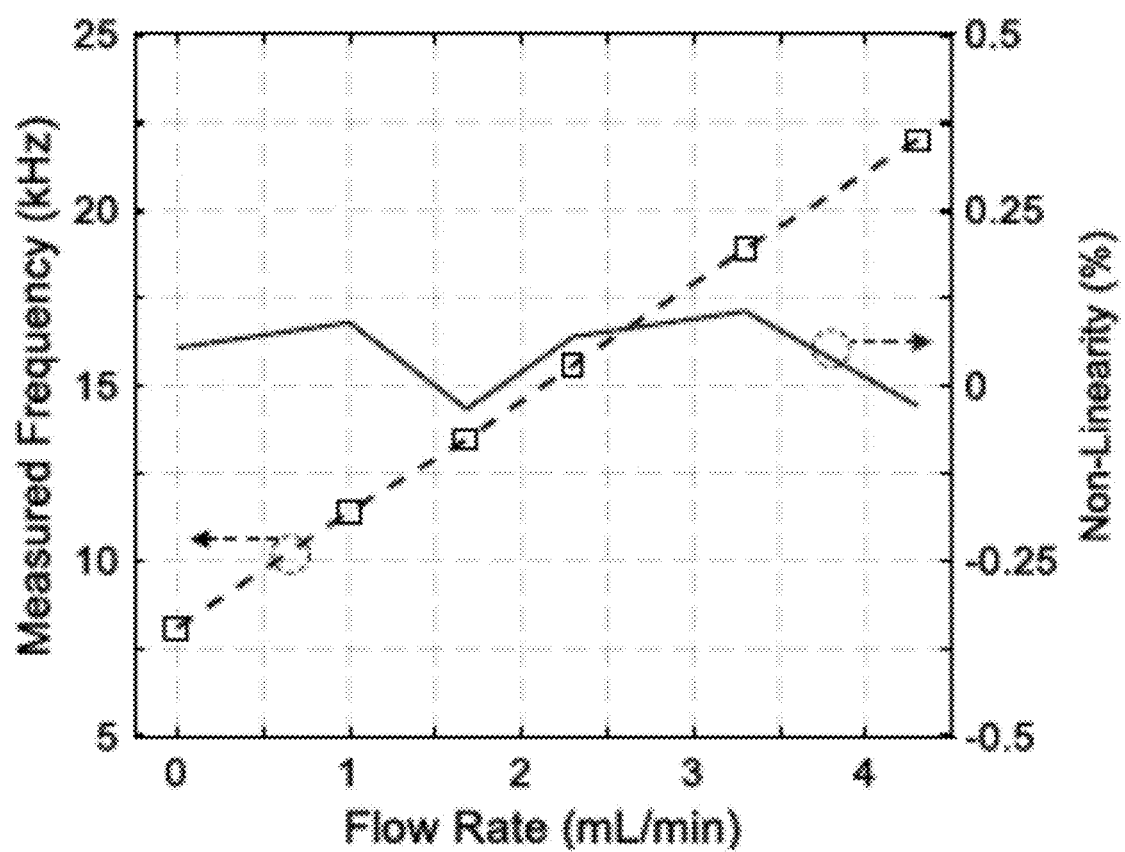
FIG. 11 shows measured output frequency versus flow rate and the corresponding non-linearity.

The recorded positive shifted Doppler frequency output corresponding to the programmed blood flow range and their associated non-linearities are shown in FIG. 11. The measured current having fixed amplitude, the corresponding modulated frequencies, and linearity show that the C-F converter can measure the flow rate down to 1 mL/min, where there was a noticeable change between baseline and modulated frequency output. It can resolve the change in flow rates as tiny as 0.62 mL/min. The measurement results show ¡98% linearity between flow rate variation and the corresponding output frequency.

Figure 12:
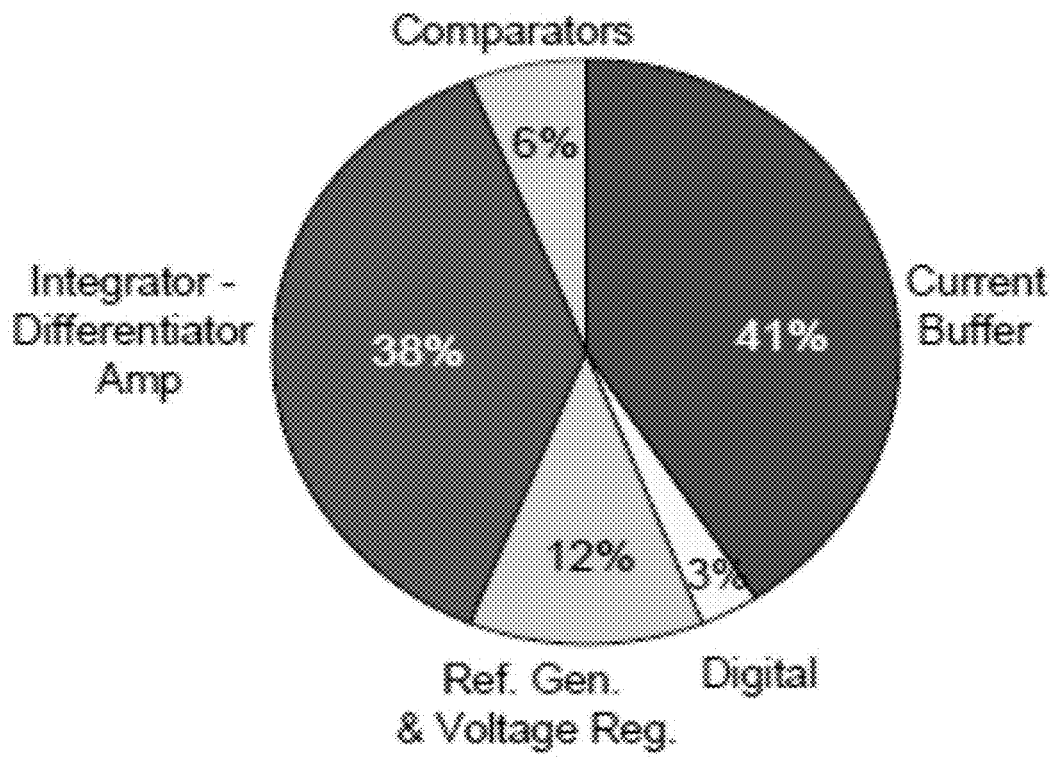
FIG. 12 shows power consumption of the parts in PCB design.

Table I summarizes the main performance of our proof of-concept device and compares our work with prior arts. With our proposed asynchronous architecture where the predefined sampling clock does not limit the bandwidth, this work achieves a large maximum measurable current of 650 nA. Integrator-differentiator TIA designs as well as the current-to-frequency converters introduce a DC-servo loop and a mixed-signal feedback loop respectively, to subtract the DC offset, which in result increases the complexity of the feedback loop as well as power consumption. In comparison, our proposed design does not require such a loop, as the differential nature of the current buffer will cancel the DC photocurrent. Furthermore, the sink resistor used to cancel equivalent DC in the servo loop entails an upper limit on the maximum DC offset cancellation. Our method comprising a current buffer is devoid of such limitations. Moreover, previous designs have the integrator-differentiator TIA implemented on-board exclusive of the sensor head photodiode. FIG. 12 shows, the distribution of total power consumption 108.9 mW of our device, which includes the power consumption of the sensor head (excluding LD), C-V converter (integrator differentiator TIA), and C-F converter.

V. Conclusion

A blood flow measurement system has been proposed for patients suffering from the peripheral artery disease. By combining the photo-current sensing mechanism with Doppler effect, we have successfully measured the blood flow variations in constricted tubes that emulate human peripheral arteries. Our system can evaluate the flow states and provide quantitative data essential in making early decisions. Our proposed system features both the optical and electrical modules integrated on a single PCB with dimensions of 55 mm×65 mm and does not require optical fiber or filter. Consequently, by avoiding the dynamic artifacts, improved noise performance and reduced coupling loss have been achieved. Because of its compact size (will be scaled further), this integrated blood flowmeter can be applied in home-care settings as a selfmonitoring wearable health system.

Example 2—Diagnosis of PAD

A patient wears a disclosed monitoring device. The device provides continuous blood flow data that results in a diagnosis of PAD.

Example 3—Diagnosis of Heart Disease

A patient wears a disclosed monitoring device. The device provides continuous blood flow data that results in a diagnosis of heart disease.

Example 4—Diagnosis of Cerebrovascular Disease

A patient wears a disclosed monitoring device. The device provides continuous blood flow data that results in a diagnosis of cerebrovascular disease.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

The terms "a," "an," "the" and similar referents used in the context of describing the invention (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Certain embodiments of this invention are described herein, including the best mode known to the inventors for carrying out the invention. Of course, variations on these described embodiments will become apparent to those of ordinary skill in the art upon reading the foregoing description. The inventor expects skilled artisans to employ such variations as appropriate, and the inventors intend for the invention to be practiced otherwise than specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

Specific embodiments disclosed herein may be further limited in the claims using consisting of or consisting essentially of language. When used in the claims, whether as filed or added per amendment, the transition term "consisting of" excludes any element, step, or ingredient not specified in the claims. The transition term "consisting essentially of" limits the scope of a claim to the specified materials or steps and those that do not materially affect the basic and novel characteristic(s). Embodiments of the invention so claimed are inherently or expressly described and enabled herein.

Disclosed embodiments comprise:

Embodiment 1) A system for continuously monitoring blood flow in a patient, said system comprising:
   an LED;
   a photo-diode;
   a current buffer;
   an integrator providing both current to voltage conversion and current to frequency conversion; and
   an integrator-differentiator transimpedance amplifier.

Embodiment 2) The system of embodiment 1, wherein said system is wearable.

Embodiment 3) The system of embodiment 2, wherein said system comprises a strap, an adhesive, or elastic.

Embodiment 4) The system of embodiment 3, wherein said system comprises a strap.

Embodiment 5) The system of embodiment 3, wherein said system comprises an adhesive.

Embodiment 6) The system of embodiment 3, wherein said system comprises elastic.

Embodiment 7) The system of embodiment 3, wherein said LED comprises a peak wavelength sensitivity at 630 nm.

Embodiment 8) The system of embodiment 3, wherein said photo-diode is sensitive to the wavelength range of 627 nm to 645 nm.

Embodiment 9) The system of embodiment 1, further comprising a reference voltage generator.

Embodiment 10) The system of embodiment 1, wherein said current-to-voltage and current-to-frequency conversions do not require an external clock source.

Embodiment 11) The system of embodiment 1, wherein said system does not comprise an optical filter.

Embodiment 12) The system of embodiment 1, wherein said system can switch between voltage mode and frequency mode.

Embodiment 13) The system of embodiment 12, wherein said system operates in frequency mode when the input current signal is larger in magnitude.

Embodiment 14) The system of embodiment 12, wherein said system operates in voltage mode when the input current signal is smaller in magnitude.

Embodiment 15) A method for continuously monitoring blood flow in a patient, said method comprising affixing the system of embodiment 1 to the patient.

Embodiment 16) A method for diagnosing irregularities in blood flow in a patient, said method comprising affixing the system of embodiment 1 to the patient.

Embodiment 17) The method of embodiment 16, wherein said irregularities are caused by peripheral arterial disease (PAD), heart disease, body stiffness, numbness, or cerebrovascular disease.

Furthermore, numerous references have been made to patents and printed publications throughout this specification. Each of the above-cited references and printed publications are individually incorporated herein by reference in their entirety.

In closing, it is to be understood that the embodiments of the invention disclosed herein are illustrative of the principles of the present invention. Other modifications that may be employed are within the scope of the invention. Thus, by way of example, but not of limitation, alternative configurations of the present invention may be utilized in accordance with the teachings herein. Accordingly, the present invention is not limited to that precisely as shown and described.

TABLE 1

TABLE I: Performance Comparison of Current Sensing Front-End for Bio-medical Applications.

|  | [20] | [25] | [16] | [32] | [33] | [34] | This Work |
|---|---|---|---|---|---|---|---|
| Application | Nanoparticles nanopores | Single molecule sensing | DNA sequencing | Biomolecules | Near Infrared Spectroscopy | Bilayer lipid membrane | Blood Flowmetery |
| Technology | 0.50 µm CMOS | 0.350 µm CMOS | Discrete IC | Discrete IC | 0.18 µm CMOS | 0.35 µm CMOS | Discrete IC |
| Power Supply | 3.3 V | 1.5 V | ±5 V | ±10 V | 3.3 V | 3.3 ± 1.65 V | ±3.3 V |
| Signal Bandwidth | 50 Hz-50 kHz | 4 MHz | 950 kHz | 1.4 MHz | <20 Hz | 10 kHz | 20 kHz |
| Max. Meas. Current | 13 nA | 25 nA | 158 nA | 10 nA | 200 µA | 20 nA | 650 nA |
| Dynamic Range | 74 dB | 95.9 dB | 93.3 dB | None | 95 dB | None | 96 dB |
| Sampling check $f_x$ | 100 Hz-100 kHz | None | None | None | 2 kHz | 20 kHz | None |
| Non-linearity | n/a | n/a | n/a | n/a | n/a | n/a | 0.05% |
| Transimpedance Gain | n/a | 146 dBΩ | 149 dBΩ | 146 dBΩ | 130 dBΩ | n/a | 151 dBΩ |
| Power Consumption | 1.5 mW | 45 mW* | 65 mW | 650 mW | 0.196 mW | 40 mW | 108.9 mW |

*Power consumption of Integrator-Differentiator based TIA only.

What is claimed is:

1. A system for continuously monitoring blood flow in a patient, said system comprising:
   an LED;
   a photo-diode;
   a current buffer;
   an integrator providing both current to voltage conversion and current to frequency conversion; and
   an integrator-differentiator transimpedance amplifier.

2. The system of claim 1, wherein said system is wearable.

3. The system of claim 2, wherein said system comprises a strap, an adhesive, or elastic.

4. The system of claim 3, wherein said system comprises a strap.

5. The system of claim 3, wherein said system comprises an adhesive.

6. The system of claim 3, wherein said system comprises elastic.

7. The system of claim 3, wherein said LED comprises a peak wavelength sensitivity at 630 nm.

8. The system of claim 3, wherein said photo-diode is sensitive to the wavelength range of 627 nm to 645 nm.

9. The system of claim 1, further comprising a reference voltage generator.

10. The system of claim 1, wherein said current-to-voltage and current-to-frequency conversions do not require an external clock source.

11. The system of claim 1, wherein said system does not comprise an optical filter.

12. The system of claim 1, wherein said system can switch between voltage mode and frequency mode.

13. The system of claim 12, wherein said system operates in frequency mode when the input current signal is larger in magnitude.

14. The system of claim 12, wherein said system operates in voltage mode when the input current signal is smaller in magnitude.

15. A method for continuously monitoring blood flow in a patient, said method comprising affixing the system of claim 1 to the patient.

16. A method for diagnosing irregularities in blood flow in a patient, said method comprising affixing the system of claim 1 to the patient.

17. The method of claim 16, wherein said irregularities are caused by peripheral arterial disease (PAD), heart disease, body stiffness, numbness, or cerebrovascular disease.

* * * * *